(12) United States Patent
Raja et al.

(10) Patent No.: US 11,504,287 B2
(45) Date of Patent: Nov. 22, 2022

(54) ELECTRIC VEHICLE

(71) Applicant: Suzuki Motor Corporation, Hamamatsu (JP)

(72) Inventors: Gopinath Raja, Hamamatsu (JP); Masayoshi Wada, Hamamatsu (JP); Tomoya Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 295 days.

(21) Appl. No.: 16/985,430

(22) Filed: Aug. 5, 2020

(65) Prior Publication Data

US 2021/0059879 A1 Mar. 4, 2021

(30) Foreign Application Priority Data

Aug. 27, 2019 (JP) .............................. JP2019-154840

(51) Int. Cl.
| | | |
|---|---|---|
| *A61G 5/04* | (2013.01) | |
| *A61G 5/10* | (2006.01) | |
| *A61G 5/12* | (2006.01) | |

(52) U.S. Cl.
CPC ........... *A61G 5/041* (2013.01); *A61G 5/1056* (2013.01); *A61G 5/122* (2016.11)

(58) Field of Classification Search
CPC ........ A61G 5/08; A61G 5/0833; A61G 5/085; A61G 5/0866; A61G 5/0841; A61G 5/122; A61G 5/1056; A61G 5/14
See application file for complete search history.

(56) References Cited

U.S. PATENT DOCUMENTS

| | | | | |
|---|---|---|---|---|
| 4,834,409 | A * | 5/1989 | Kramer | B62D 49/0678 180/209 |
| 6,340,168 | B1 * | 1/2002 | Woleen | A61G 5/0833 280/33.996 |
| 9,333,986 | B2 * | 5/2016 | Kim | A61G 5/0833 |
| 10,987,261 | B2 * | 4/2021 | Raja | B62D 21/14 |
| 11,123,243 | B2 * | 9/2021 | Wada | A61G 5/1089 |

(Continued)

FOREIGN PATENT DOCUMENTS

| | | |
|---|---|---|
| JP | H1085268 A | 4/1998 |
| JP | 2002233007 A | 8/2002 |

(Continued)

*Primary Examiner* — Kevin Hurley
*Assistant Examiner* — Harold Eric Pahlck, III
(74) *Attorney, Agent, or Firm* — Lerner, David, Littenberg, Krumholz & Mentlik, LLP

(57) ABSTRACT

An electric vehicle includes: a mobile base capable of traveling by an electromotive drive; a seat including a seating portion having a sitting surface; and a battery capable of supplying electric power used in the electromotive drive. The seating portion of the seat includes a receiving portion capable of receiving the battery and arranged on a seat lower side with respect to the sitting surface. The mobile base is changeable between an expanded state in which a wheelbase is expanded and a contracted state in which the wheelbase is more contracted than in the expanded state. The seat is movable between a sitting position that the sitting surface faces a vehicle upper side in an expanded state of the mobile base, and a retracted position that the seating portion is retracted from the sitting position to a vehicle front side in a contracted state of the mobile base.

2 Claims, 5 Drawing Sheets

(56) References Cited

U.S. PATENT DOCUMENTS

| | | | |
|---|---|---|---|
| 11,173,080 B2* | 11/2021 | Raja | B60B 19/003 |
| 11,267,388 B2* | 3/2022 | Raja | B60P 3/423 |
| 2005/0151334 A1* | 7/2005 | Flowers | B62K 21/00 |
| | | | 280/47.11 |
| 2010/0084831 A1* | 4/2010 | Wang | A61G 5/1089 |
| | | | 280/39 |
| 2010/0117328 A1* | 5/2010 | Johnson | A61G 5/045 |
| | | | 280/288.4 |

FOREIGN PATENT DOCUMENTS

| | | |
|---|---|---|
| JP | 2003237380 A | 8/2003 |
| JP | 2016168153 A | 9/2016 |

* cited by examiner

ELECTRIC VEHICLE

CROSS-REFERENCE TO RELATED APPLICATIONS

This application claims the benefit of the filing date of Japanese Patent Application No. 2019-154840, filed on Aug. 27, 2019, the disclosure of which is hereby incorporated herein by reference.

BACKGROUND OF THE INVENTION

Technical Field

The present invention relates to an electric vehicle including a mobile base configured to be capable of traveling by an electromotive drive, and a battery configured to be capable of supplying electric power used in the electromotive drive.

Background Art

As means of transportation for users, such as the elderly, people in need of care, and/or the like, an electric vehicle, such as an electric-powered wheelchair, an electric-powered cart, or the like that can travel by driving means, such as a motor or the like, is becoming popular. The electric vehicle as above may be called a "mobility scooter." The electric vehicle typically includes: a mobile base configured to be capable of traveling by an electromotive drive; and a seat having a seating portion and arranged on the mobile base, and the user can move in a state of sitting on the seating portion of the seat of the electric vehicle. The electric vehicle includes a battery configured to be capable of supplying electric power used in the electromotive drive. The battery may be mounted on the seat.

An electric vehicle cited as one example of the above electric vehicle, is configured such that a receiving compartment receiving a battery, is provided on a seat lower surface, and an opening portion for taking the battery in and out, is provided on the front surface side of the receiving compartment.

SUMMARY OF THE INVENTION

Technical Problem

In the electric vehicle, there may be cases in which the battery must be replaced, even when the user is in a state of sitting on the seat. However, in one example of the electric vehicle, in the state in which the user is sitting on the seat, the legs of the user are positioned on the front side of the opening portion so as to block the opening portion. In this case, it is difficult to take the battery into and out of the receiving compartment via the opening portion. Therefore, in one example of the electric vehicle, the battery cannot be easily replaced, and the battery cannot be efficiently charged in a wide variety of circumstances.

In view of the circumstances described above, in the electric vehicle, it is desired that the battery can be efficiently replaced in a wide variety of circumstances and the battery can be efficiently charged in a wide variety of circumstances.

Solution to the Problem

To solve the problems as described above, an electric vehicle according to one aspect includes: a mobile base configured to be capable of traveling by an electromotive drive; a seat arranged on the mobile base and including a seating portion having a sitting surface; and a battery configured to be capable of supplying electric power used in the electromotive drive, the seating portion of the seat includes a receiving portion capable of receiving the battery and arranged closer to a lower of the seat than the sitting surface, the mobile base includes: a front base having a front wheel; and a rear base arranged closer to a rear of the vehicle than to the front base and having a rear wheel, the front and rear bases are configured to be moveable relative to each other such that the mobile base is changeable between an expanded state in which a wheelbase between the front wheel and the rear wheel is expanded, and a contracted state in which the wheelbase is more contracted than in the expanded state, the seat is configured to be moveable between a sitting position that the sitting surface is arranged so as to be directed to an upper of the vehicle, and a retracted position that the seating portion is retracted from the sitting position to a front of the vehicle, the seat is configured so as to be arrangeable in the sitting position in the expanded state, and is arrangeable in the retracted position in the contracted state, and the receiving portion has an opening formed in a rear-end portion of the seating portion in a seat front-rear direction such that the battery is receivable in the receiving portion and the battery is removeable from the receiving portion.

Advantageous Effects of the Invention

In the electric vehicle according to one aspect, the battery can be efficiently replaced in a wide variety of circumstances, and the battery can be efficiently charged in a wide variety of circumstances.

DETAILED DESCRIPTION

Figure 1:
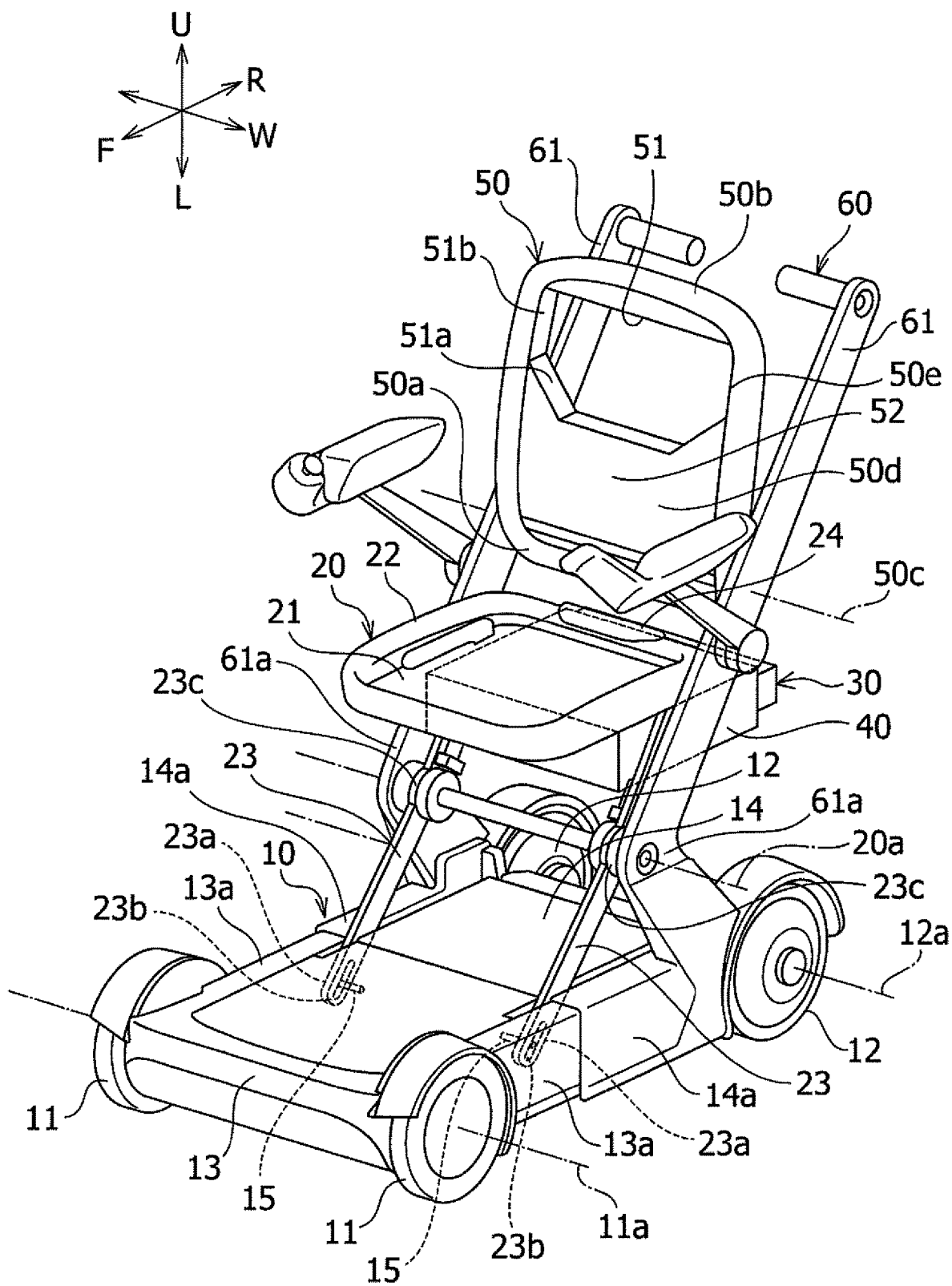
FIG. 1 is a front perspective view schematically showing an electric vehicle according to an Embodiment in an unfolded state.

An electric vehicle according to an Embodiment will be described below. The electric vehicle according to this Embodiment is a single-seater vehicle, and the electric vehicle is configured such that a seat installed thereon is opened to the outside of the electric vehicle. For example, the electric vehicle may be an electric-powered wheelchair, an electric-powered cart, or the like, and the electric vehicle particularly may be a single-seater electric-powered wheelchair, a single-seater electric-powered cart, or the like. However, the electric vehicle is not limited to those configurations. The electric vehicle is simply called a "vehicle" below, as necessary.

In the drawings used to explain this Embodiment, directions defined based on the vehicle, are indicated as follows. Specifically, the vehicle front side and the vehicle rear side are indicated by a single-headed arrow F and a single-headed arrow R respectively. Therefore, the vehicle front-rear direction is indicated by the single-headed arrow F and the single-headed arrow R. The vehicle width direction is indicated by a double-headed arrow W. The vehicle upper side and the vehicle lower side are indicated by a single-headed arrow U and a single-headed arrow L respectively. Therefore, the vehicle upper-lower direction is indicated by the single-headed arrow U and the single-headed arrow L.

Outline of Electric Vehicle

The outline of the electric vehicle according to the Embodiment will be described. As shown in FIGS. 1 to 4, the vehicle includes a mobile base 10 configured to be capable of traveling by an electromotive drive. The vehicle includes one seat 20 arranged on the mobile base 10. The seat 20 includes a seating portion 22 having a sitting surface 21 configured such that the user can sit thereon. In particular, the seat 20 may be for one person. However, the seat of the vehicle is not limited to the above.

Directions based on the seat 20 are defined as follows. The sitting surface 21 side of the seat 20 is defined as a "seat upper side". The side opposite to the sitting surface 21 of the seat 20, that is to say, the side opposite to the "seat upper side" is defined as a "seat lower side". A "seat upper-lower direction" is defined based on the "seat upper side" and the "seat lower side". The front surface side of the seating portion 22 of the seat 20 is defined as a "seat front side". The rear surface side of the seating portion 22 of the seat 20, that is to say, the side opposite to the "seat front side" is defined as a "seat rear side". A "seat front-rear direction" is defined based on the "seat front side" and the "seat rear side". The direction orthogonal to the "seat upper-lower direction" and the "seat front-rear direction" is defined as a "seat width direction". The "seat width direction" may substantially match with the vehicle width direction.

The vehicle includes a battery 30 configured to be capable of supplying electric power used in the electromotive drive. The seating portion 22 of the seat 20 includes a receiving portion 40 configured to be capable of receiving the battery 30. The receiving portion 40 is arranged on the seat lower side with respect to the sitting surface 21 of the seat 20.

The mobile base 10 includes two front wheels 11, and two rear wheels 12 positioned so as to be spaced apart from those front wheels 11 to the vehicle rear side. The front wheels 11 and the rear wheels 12 are traveling wheels of the vehicle. However, the mobile base only needs to include at least one front wheel and two or more rear wheels, or include two or more front wheels and at least one rear wheel.

Figure 2:
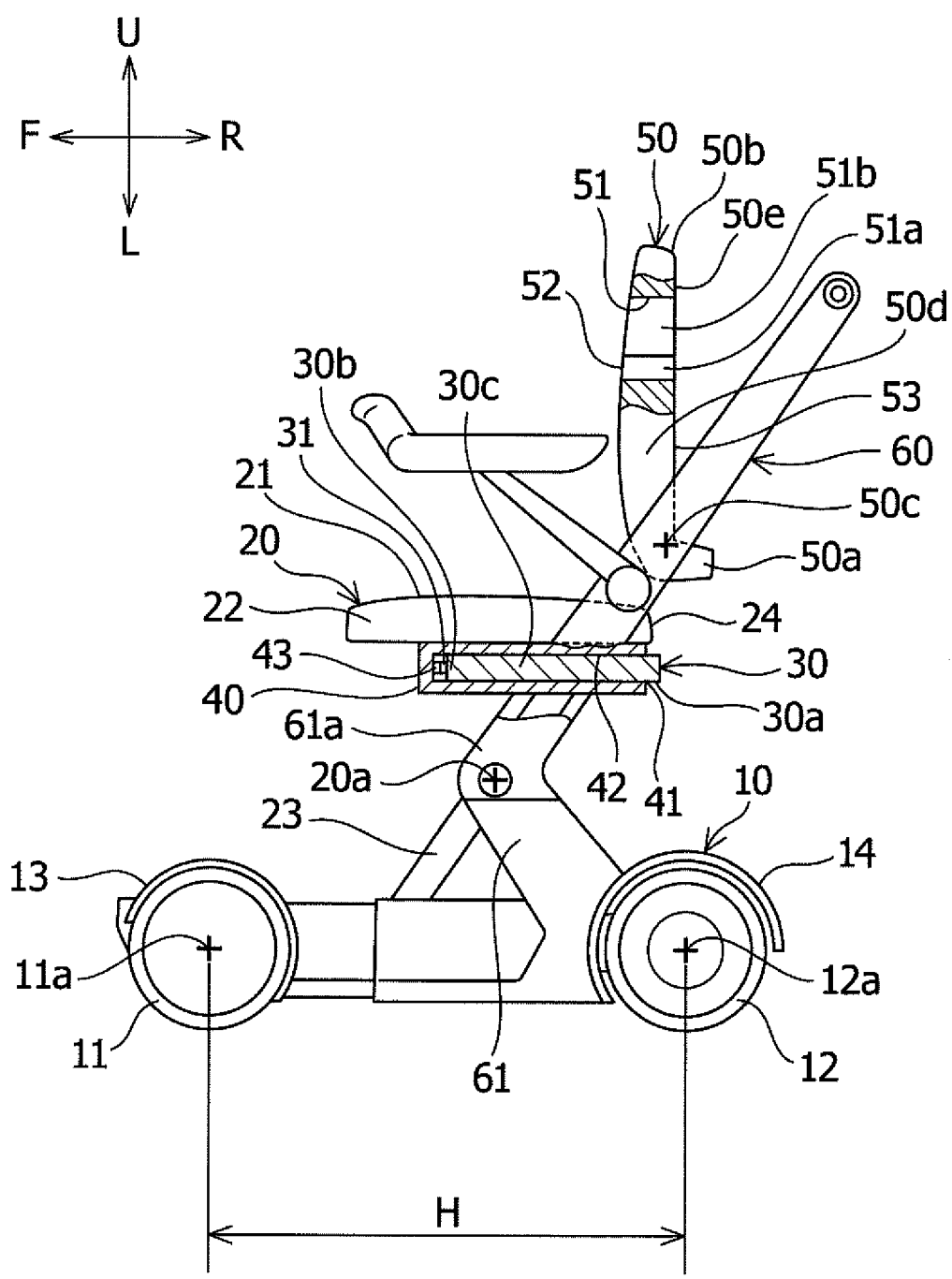
FIG. 2 is a side view schematically showing the electric vehicle according to the Embodiment in the unfolded state in a partially cross-sectional view.
Figure 3:
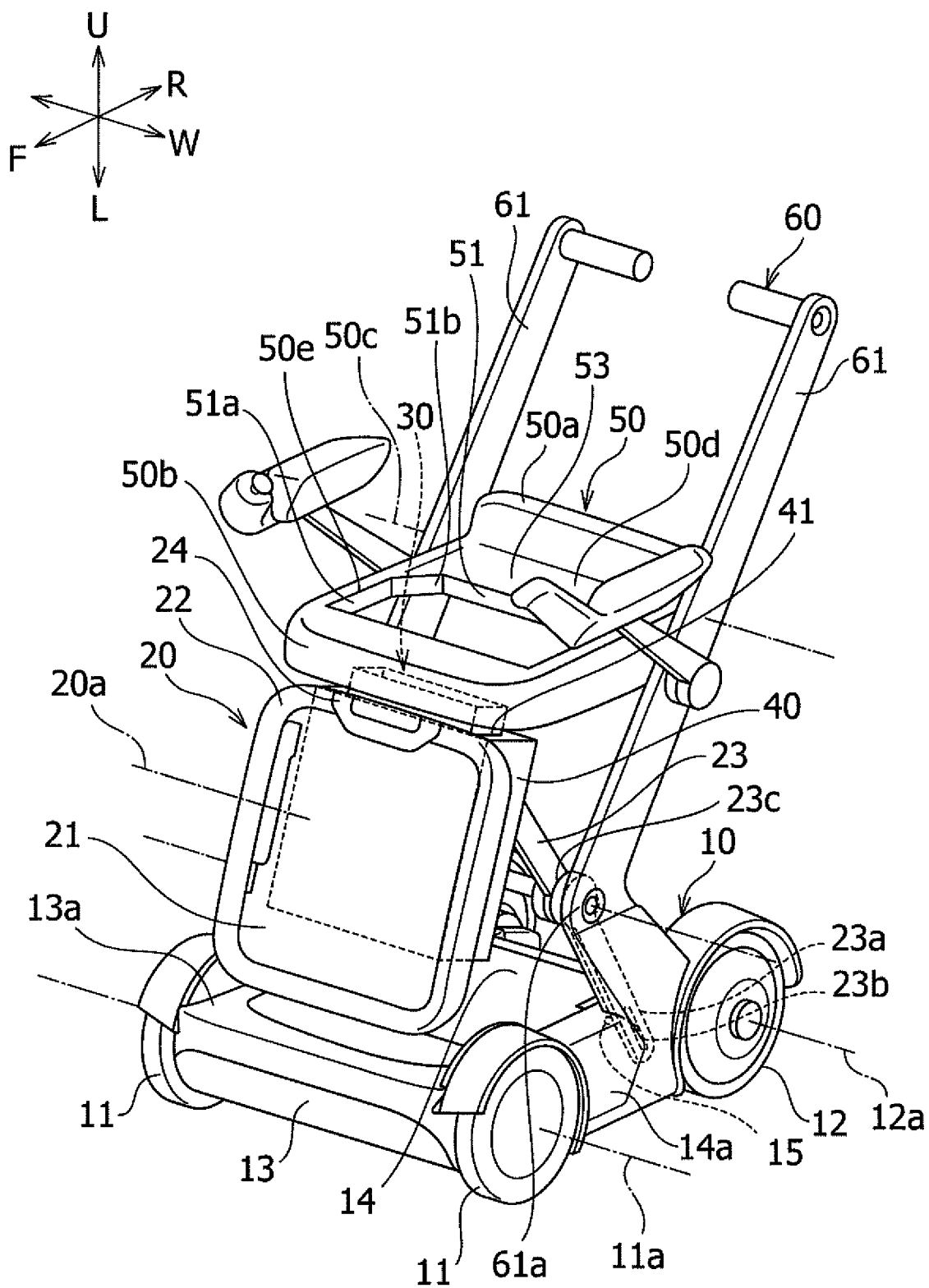
FIG. 3 is a front perspective view schematically showing the electric vehicle according to the Embodiment in a folded state.
Figure 4:
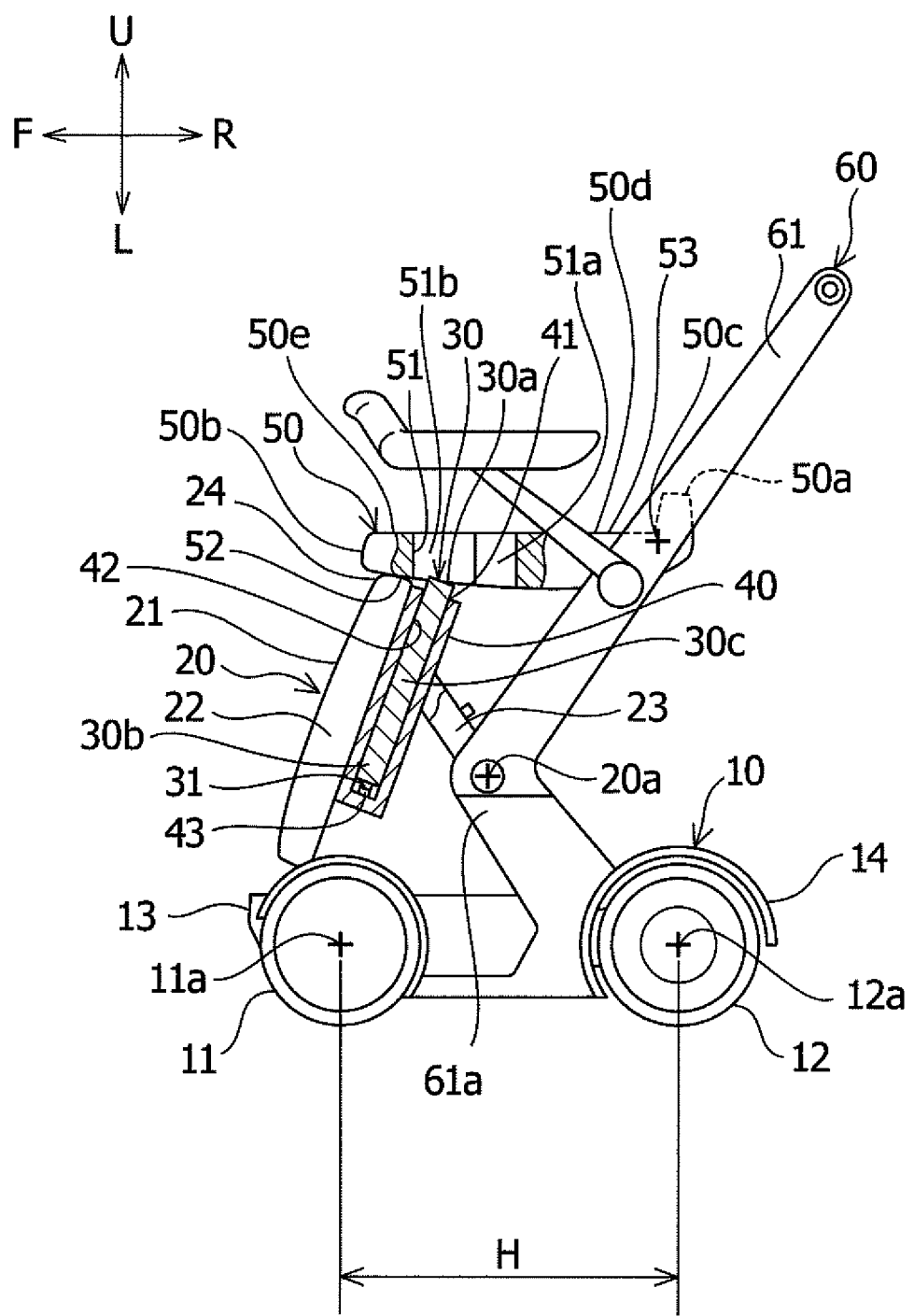
FIG. 4 is a side view schematically showing the electric vehicle according to the Embodiment in the folded state in a partially cross-sectional view.

The mobile base 10 includes a front base 13 having the front wheels 11, and a rear base 14 having the rear wheels 12. The rear base 14 is arranged on the vehicle rear side with respect to the front base 13. The front and rear bases 13 and 14 are configured to be moveable relative to each other so as to be changeable between the expanded state and the contracted state of the mobile base 10. As shown in FIGS. 1 and 2, the expanded state of the mobile base 10 is a state in which a wheelbase H between the front wheels 11 and the rear wheels 12 of the mobile base 10 is expanded. As shown in FIGS. 3 and 4, the contracted state of the mobile base 10 is a state in which the wheelbase H is more contracted than in the expanded state.

The seat 20 is configured to be moveable between a sitting position and a retracted position. As shown in FIGS. 1 and 2, the sitting position of the seat 20 is a position in which the seat 20 is arranged such that the sitting surface 21 faces the vehicle upper side. The seat 20 may be arranged in the sitting position in the expanded state of the mobile base 10. As shown in FIGS. 3 and 4, the retracted position of the seat 20 is a position in which the seat 20 is arranged such that the seating portion 22 is retracted from the sitting position to the vehicle front side. The seat 20 may be arranged in the retracted position in the contracted state of the mobile base 10.

The receiving portion 40 has an opening 41 formed such that the battery 30 is receivable in the receiving portion 40 and the battery 30 is removeable from the receiving portion 40. The opening 41 is provided in a rear-end portion of the seating portion 22 in the seat front-rear direction.

The electric vehicle according to this Embodiment may be schematically configured as follows. As shown in FIGS. 1 to 4, the vehicle includes a back plate 50 configured so as to be usable as a backrest corresponding to the seating portion 22. The back plate 50 is arranged on the mobile base 10.

The back plate 50 is configured to be movable between a raised position and a laid down position. As shown in FIGS. 1 and 2, the raised position of the back plate 50 is a position in which the back plate 50 is arranged on the vehicle rear side and the vehicle upper side with respect to the seating portion 22 in the sitting position. The back plate 50 may be arranged in the raised position in a state in which the seat 20 is arranged in the sitting position. As shown in FIGS. 3 and 4, the laid down position of the back plate 50 is a position in which the back plate 50 is laid down to the vehicle front side with respect to the raised position. The back plate 50 may be arranged in the laid down position in a state in which the seat 20 is arranged in the retracted position.

As shown in FIGS. 1 to 4, the back plate 50 has a through hole 51 formed so as to pass through the back plate 50. As shown in FIGS. 3 and 4, the through hole 51 is formed so as to correspond to the opening 41 in the receiving portion 40 of the seating portion 22 in the seat 20 and such that the battery 30 is passable therethrough in a state in which the seat 20 is in the retracted position and the back plate 50 is in the laid down position. As shown in FIGS. 1 to 4 again, the vehicle includes a frame 60 arranged on the rear base 14.

Details of Mobile Base

In detail, the mobile base 10 may be configured as follows. As shown in FIGS. 1 to 4, in the mobile base 10, to expand and contract the wheelbase H, the rear wheels 12 are driven and the front wheels 11 are stopped. In other words, when the wheelbase H is expanded, the rear wheels 12 are rotatably driven so as to move the rear base 14 to the vehicle rear side, and the front wheels 11 are stopped so as to keep the front base 13 at a fixed position. When the wheelbase H is contracted, the rear wheels 12 are rotatably driven so as to move the rear base 14 to the vehicle front side, and the front wheels 11 are stopped so as to keep the front base 13 at a fixed position.

However, the mobile base may be configured so as to drive the front wheels and stop the rear wheels in order to expand and contract the wheelbase. The mobile base may be configured such that the front wheels and the rear wheels are driven in an inverted manner with respect to each other to expand and contract the wheelbase.

The front and rear bases 13 and 14 of the mobile base 10 can substantially linearly slide relative to each other in the vehicle front-rear direction. In an overlapping region between the front and rear bases 13 and 14, the front base 13 can be positioned on the vehicle lower side with respect to the rear base 14. When the front and rear bases 13 and 14 move relative to each other, the front base 13 can pass through the inner portion of the rear base 14 in a base overlapping region 10a. However, the positional relationship of the front and rear bases in the vehicle upper-lower direction is not limited thereto.

The difference in the length of the wheelbase H between the expanded state and the contracted state of the mobile base 10 may be equal to or more than a half of the maximum length of the seat 20 in the seat front-rear direction and equal to or less than the same maximum length. The vehicle can stably travel while stably supporting the user that is riding when the mobile base 10 is in the expanded state, and the vehicle can be compact and make sharp turns when the mobile base 10 is in the contracted state.

The front base 13 of the mobile base 10 includes two front side members 13a arranged so as to be spaced apart from each other in the vehicle width direction. The two front wheels 11 are attached to front-end portions of the two front side members 13a in the vehicle front-rear direction respectively so as to be rotatable about a rotation axis 11a extending in the vehicle width direction.

Each of the front side members 13a includes a turning shaft 15 formed so as to protrude to the vehicle width direction from a rear-end portion of the front side member 13a in the vehicle front-rear direction. Although details are described below, leg portions 23 of the seat 20 are attached to the turning shafts 15, respectively. The turning shafts 15 are arranged so as to avoid interference with the rear base 14 when the front and rear bases 13 and 14 move relative to each other.

As shown in FIG. 1, the turning shafts 15 may be respectively positioned in front-end portions of rear side members 14a described next in the vehicle front-rear direction in the expanded state of the mobile base 10. As shown in FIG. 3, the turning shafts 15 may be positioned near the rear wheels 12 respectively in the contracted state of the mobile base 10.

As shown in FIGS. 1 and 3, the rear base 14 of the mobile base 10 includes the two rear side members 14a arranged to be spaced apart from each other in the vehicle width direction. The two rear wheels 12 are attached to rear-end portions of the two rear side members 14a in the vehicle front-rear direction respectively so as to be rotatable about a rotation axis 12a extending in the vehicle width direction.

Although not particularly shown in a clear manner, a braking apparatus configured so as to be capable of braking the two front wheels 11, is mounted in the front base 13 of the mobile base 10. Driving motors for rotatably driving the rear wheels 12 are mounted on the rear base 14 of the mobile base 10. For example, the driving motors are arranged so as to be adjacent to the rear wheels 12 in the vehicle width direction respectively, or the driving motors are built in the rear wheels 12 respectively. However, the driving motors are not limited thereto.

In the vehicle as above, the braking apparatus, a control apparatus, and the driving motors are electrically connected to the battery 30. The battery 30 can supply electric power to the braking apparatus, the control apparatus, and the driving motors. The control apparatus is connected to the braking apparatus and the driving motors. The control apparatus can control the battery 30 and the driving motors.

Details of Seat

In detail, the seat 20 may be configured as follows. As shown in FIGS. 1 to 4, the seat 20 further includes the two leg portions 23 that support the seating portion 22. The two leg portions 23 are arranged so as to be spaced apart from each other in the seat width direction. However, the seat may be configured so as to include at least one leg portion.

In the seat 20, the seating portion 22 moves to the vehicle front side by the movement of the leg portions 23 in accordance with the relative movement of the front and rear bases 13 and 14 in the vehicle front-rear direction for contracting the wheelbase H. The seating portion 22 moves to the vehicle rear side by the movement of the leg portions 23 in accordance with the relative movement of the front and rear bases 13 and 14 in the vehicle front-rear direction for expanding the wheelbase H.

As shown in FIGS. 1 and 2, the seating portion 22 is arranged in the sitting position in the expanded state of the mobile base 10. The seat 20 may be arranged such that the sitting surface 21 of the seating portion 22 is substantially along the vehicle horizontal direction in a state in which the seat 20 is in the sitting position. As shown in FIGS. 3 and 4, the seat 20 is arranged in the retracted position in the contracted state of the mobile base 10. The seat 20 may be arranged such that the sitting surface 21 of the seating portion 22 faces a plane extending in the vehicle upper-lower direction and the vehicle width direction at a predetermined angle in a state in which the seat 20 is in the retracted position. The absolute value of the angle is approximately 30 degrees or less. However, the angle of the sitting surface is not limited thereto.

As shown in FIGS. 1 to 4, a front-end zone of the seating portion 22 in the seat front-rear direction is a free end. In a state in which the seat 20 is in the sitting position, the front-end zone of the seating portion 22 is positioned on the vehicle front side with respect to a rear-end zone of the seating portion 22 in the seat front-rear direction, and the rear-end zone of the seating portion 22 is positioned so as to substantially match with a frame 60 in the vehicle front-rear direction. In a state in which the seat 20 is in the retracted position, the rear-end zone of the seating portion 22 is positioned on the vehicle upper side with respect to the front-end zone of the seating portion 22, and is positioned to be spaced apart from the frame 60 to the vehicle front side.

The seat 20 includes a back-plate support mechanism 24 configured so as to support the back plate 50 in a state in which the seat 20 and the back plate 50 are in the retracted position and the laid down position respectively. The back-plate support mechanism 24 is the rear-end zone of the seating portion 22 in the seat front-rear direction. However, the present invention is not limited thereto.

The leg portions 23 extend so as to incline toward the seat front side from the seat rear side as the leg portions 23 approach the seat lower side from the seat upper side. The leg portions 23 may respectively extend to the seat lower side from side end zones of the seating portion 22 in the seat width direction corresponding to the leg portions 23, respectively.

The leg portions 23 respectively include base attachment zones 23a configured so as to attach the leg portions 23 to the front base 13, respectively. The base attachment zones 23a are attached to the turning shafts 15 of the front side members 13a respectively so as to be capable of turning. More specifically, the base attachment zones 23a respectively have long holes 23b that are through holes in the vehicle width direction such that the turning shafts 15 can be inserted therein, respectively. The long holes 23b extend along the longitudinal direction of the leg portions 23. When the front base 13 moves to the vehicle front-rear direction with respect to the rear base 14, the turning shafts 15 respectively move in the long holes 23b along the longitudinal direction of the long holes 23b.

The leg portions 23 respectively include frame attachment zones 23c configured such that the leg portions 23 are attached to the frame 60 so as to be capable of turning with respect to the frame 60. The frame attachment zones 23c are positioned between the seating portion 22 and the base attachment zones 23a. The base attachment zones 23a of the leg portions 23 may be positioned on lower ends of the leg portions 23 in the seat upper-lower direction respectively, and the frame attachment zones 23c of the leg portions 23 may be positioned in the middle of the leg portions 23 in the seat upper-lower direction, respectively.

In the seat 20 as above, the vehicle-front-side movement of the seating portion 22 is provided by the vehicle-rear-side movement of the base attachment zones 23a of the leg portions 23 and the vehicle-front-side turning of the leg portions 23 in accordance with the relative movement of the front and rear bases 13 and 14 in the vehicle front-rear direction for contracting the wheelbase H. The seating portion 22 can move to the retracted position from the sitting position by the vehicle-front-side movement.

By the relative movement of the front and rear bases 13 and 14 in the vehicle front-rear direction for expanding the wheelbase H, the vehicle-front-side movement of the base attachment zones 23a of the leg portions 23 and the vehicle-rear-side turning of the leg portions 23 are provided. As a result, the vehicle-rear-side movement of the seating portion 22 is provided. The seat 20 can move to the sitting position from the retracted position by the vehicle-rear-side movement.

Details of Receiving Portion

In detail, the receiving portion 40 provided on the seating portion 22 of the seat 20 may be configured as follows. As shown in FIGS. 2 and 4, the receiving portion 40 has a cavity 42 depressed from the opening 41 thereof toward the seat front side. The cavity 42 is formed such that the battery 30 is receivable in the receiving portion 40 and the battery 30 is removable from the receiving portion 40 by the movement of the battery 30 in the seat front-rear direction. The cavity 42 may be formed so as to correspond to a front-end portion 30b and an intermediate portion 30c of the battery 30 in the seat front-rear direction described below.

Figure 5:
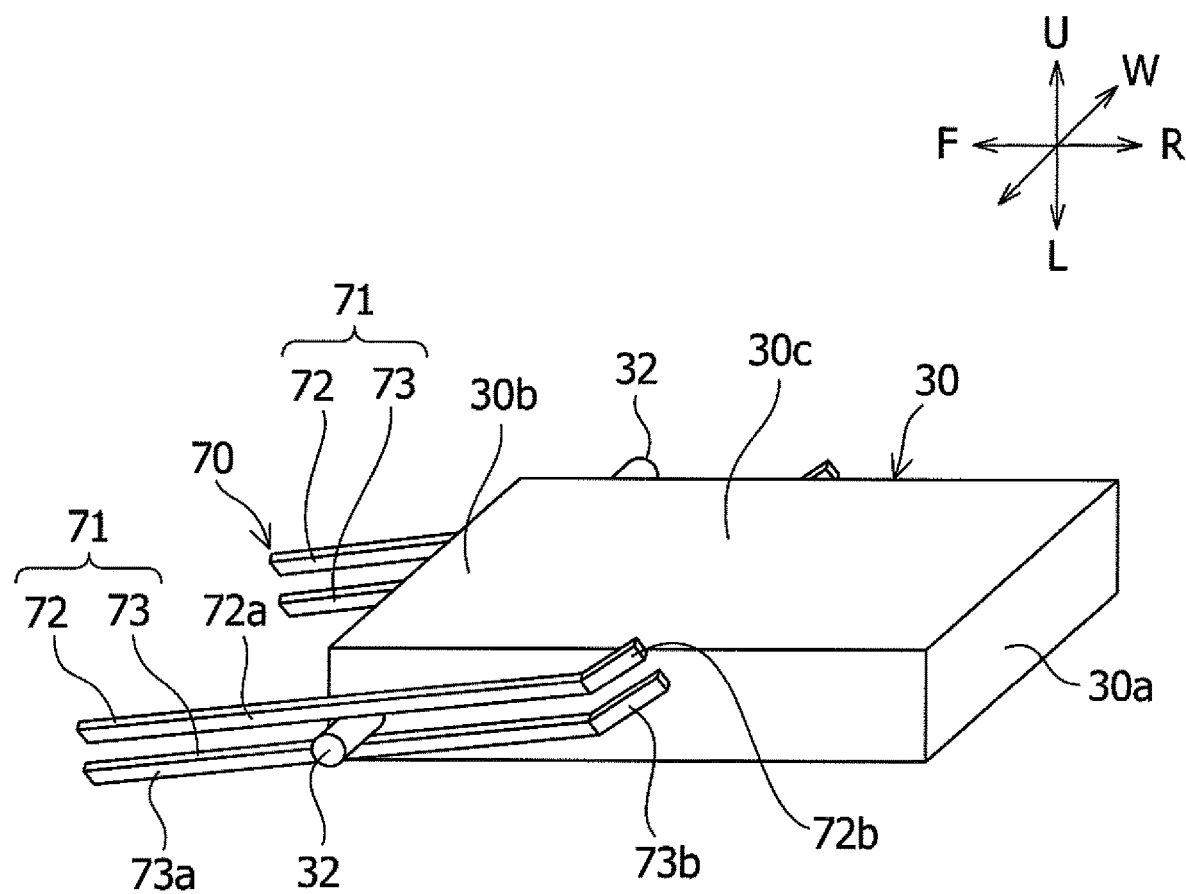
FIG. 5 is a perspective view schematically showing a battery of the electric vehicle according to the Embodiment, and a guide mechanism for the battery.

As shown in FIGS. 2 and 4, the receiving portion 40 has a connection terminal 43 that can be electrically connected to a connection terminal 31 of the battery 30. As shown in FIG. 5, the receiving portion 40 includes a guide mechanism 70 configured so as to guide the movement of the battery 30 in the seat front-rear direction when the battery 30 is received in the receiving portion 40 and the battery 30 is removed from the receiving portion 40.

Details of Guide Mechanism

In detail, the guide mechanism 70 provided on the receiving portion 40 may be configured as follows. As shown in FIG. 5, the guide mechanism 70 includes a pair of rail units 71 arranged to be spaced apart from each other in the seat width direction. The battery 30 is arranged between the pair of rail units 71 in the seat width direction. The rail units 71 are arranged along the seat front-rear direction. The rail units 71 are arranged in the receiving portion 40. Each of the rail units 71 has an upper rail 72, and a lower rail 73 arranged on the seat lower side with respect to the upper rail 72.

The upper and lower rails 72 and 73 are also arranged along the seat front-rear direction. The upper and lower rails 72 and 73 are arranged so as to be separated apart from each other in the seat upper-lower direction and face each other in the seat upper-lower direction. Guide protrusion portions 32 of the battery 30 described below, respectively pass through places between the upper and lower rails 72 and 73.

The upper and lower rails 72 and 73 respectively include rail main body portions 72a and 73a positioned on the vehicle front side. The upper and lower rails 72 and 73 respectively include stopper portions 72b and 73b positioned on the vehicle rear side with respect to the rail main body portions 72a and 73a thereof, respectively. The stopper portions 72b and 73b are positioned on rear-end portions of the upper and lower rails 72 and 73 in the seat front-rear direction, respectively.

In the upper and lower rails 72 and 73, the rail main body portions 72a and 73a and the stopper portions 72b and 73b are configured as follows. In other words, the rail main body portions 72a and 73a are inclined so as to rise up to the seat upper side as the rail main body portions 72a and 73a approach the seat rear side from the seat front side. The stopper portions 72b and 73b are also inclined so as to rise up to the seat upper side as the stopper portions 72b and 73b approach the seat rear side from the seat front side. The stopper portions 72b and 73b are inclined so as to rise up to the seat upper side in a greater manner than the rail main body portions 72a and 73a. Rear-end portions of the rail main body portions 72a and 73a in the seat front-rear direction are connected to front-end portions of the stopper portions 72b and 73b in the seat front-rear direction.

Details of Battery

In detail, the battery 30 may be configured as follows. Although not particularly shown in a clear manner, the battery 30 includes a rechargeable secondary cell. As shown in FIGS. 2 and 4, the battery 30 has the connection terminal 31 that can be electrically connected to the connection terminal 43 of the receiving portion 40. As shown in FIGS. 1 to 4, the battery 30 is received in the receiving portion 40 in a state in which a rear-end portion 30a thereof in the seat front-rear direction, protrudes to the seat rear side from the opening 41 in the receiving portion 40. The front-end portion 30b and the intermediate portion 30c of the battery 30 in the seat front-rear direction can be received in the cavity 42 of the receiving portion 40.

As shown in FIG. 5, the battery 30 includes the pair of guide protrusion portions 32 protruding from the battery 30 to both sides of the seat width direction respectively. The guide protrusion portions 32 are provided on the front-end portion 30b of the battery 30. The battery 30 can be moved to the seat front-rear direction so that the guide protrusion portions 32 slide along at least one of the upper and lower rails 72 and 73 corresponding to the guide protrusion portions 32.

Therefore, even when a force from the seat front side toward the seat rear side is applied to the battery 30 in a state in which the battery 30 is received in the receiving portion 40 and the seat 20 is in the sitting position, the movement of the battery 30 from the seat front side toward the seat rear side can be suppressed by the rail main body portions 72a and 73a of the upper and lower rails 72 and 73 inclined as described above. Even when the battery 30 moves from the seat front side to the seat rear side so as to bulge out from the opening 41 in the receiving portion 40, the battery 30 can be prevented from falling out of the vehicle by the stopper portions 72b and 73b of the upper and lower rails 72 and 73 inclined as described above.

Details of Back Plate

In detail, the back plate 50 may be configured as follows. As shown in FIGS. 1 to 4, the back plate 50 is attached to the frame 60 so as to be capable of turning between the raised position and the laid down position. The back plate 50 in the laid down position is positioned on the vehicle front side and the vehicle lower side with respect to the back plate 50 in the raised position. As shown in FIGS. 1 and 2, the back plate 50 is arranged such that a front surface 52 of the back plate 50 faces the vehicle front side in a state in which the back plate 50 is in the raised position. As shown in FIGS. 3 and 4, the back plate 50 is arranged such that the rear surface 53 of the back plate 50 faces the vehicle lower side in a state in which the back plate 50 is in the laid down position. Note that the rear surface 53 of the back plate 50 is a surface on the side opposite to the front surface 52 of the back plate 50.

As shown in FIGS. 1 to 4, the back plate 50 is formed in a substantially flat-plate-like shape. The back plate 50 has a base-end portion 50a and a distal-end portion 50b positioned on the lower end side and the upper end side in the vehicle upper-lower direction in a state in which the back plate 50 is in the raised position. The base-end portion 50a of the back plate 50 is attached to two support rods 61 of the frame 60 described below so that the back plate 50 can turn about a turning axis 50c extending in the vehicle width direction. More specifically, the base-end portion 50a of the back plate 50 is attached to intermediate portions of the two support rods 61 in the vehicle upper-lower direction.

The distal-end portion 50b of the back plate 50 is a free end. The distal-end portion 50b of the back plate 50 can be swing about the turning axis 50c between the raised position and the laid down position. As shown in FIGS. 3 and 4, in a state in which the seat 20 is in the retracted position and the back plate 50 is in the laid down position, the distal-end portion 50b of the back plate 50 is supported by a back-plate support mechanism 24 of the leg portions 23 of the seat 20.

The through hole 51 in the back plate 50 described above, passes through the back plate 50 between the front surface 52 and the rear surface 53 thereof. The through hole 51 is formed so as to pass through a distal-end-side region 50e positioned on the distal-end portion 50b side of the back plate 50. When the user leans on the back plate 50 in the raised position, the back of the user normally abuts against a base-end-side region 50d positioned on the base-end portion 50a side of the back plate 50 and the front surface 52 of the back plate 50. Therefore, even when the through hole 51 is formed in the back plate 50, the back plate 50 can fulfill the function as the backrest.

The through hole 51 has a base-end-side zone 51a positioned on the base-end portion 50a side of the back plate 50 and a distal-end-side zone 51b positioned on the distal-end portion 50b side of the back plate 50. The base-end-side zone 51a of the through hole 51 is formed such that the length thereof in the seat width direction decreases as the base-end-side zone 51a approaches the base-end portion 50a from the distal-end portion 50b of the back plate 50. The length of the distal-end-side zone 51b in the through hole 51 in the seat width direction is greater than the length of the base-end-side zone 51a thereof in the seat width direction. As shown in FIG. 4, in a state in which the seat 20 is in the retracted position and the back plate 50 is in the laid down position, the distal-end-side zone 51b out of the base-end-side and distal-end-side zones 51a and 51b of the through hole 51 may be formed so as to correspond to the opening 41 in the receiving portion 40 in the seating portion 22 of the seat 20.

Details of Frame

In detail, the frame 60 may be configured as follows. As shown in FIGS. 1 and 2, the frame 60 is arranged so as to be adjacent to the rear-end zone of the seating portion 22 of the seat 20 in the sitting position. The frame 60 includes the two support rods 61 arranged to be spaced apart from each other in the vehicle width direction. The two support rods 61 are arranged so as to correspond to the two rear side members 14a of the rear base 14 in the vehicle width direction. The two support rods 61 are arranged so as to correspond to the two leg portions 23 of the seat 20 in the vehicle width direction.

Lower end portions of the support rods 61 in the vehicle upper-lower direction are respectively attached to rear-end portions of the rear side members 14a in the vehicle front-rear direction corresponding to the support rods 61 respectively. The support rods 61 respectively include seat turning attachment portions 61a configured such that the frame attachment zones 23c of the leg portions 23 of the seat 20 corresponding to the support rods 61 respectively, can be attached thereto, respectively. The frame attachment zones 23c are attached to the seat turning attachment portions 61a respectively so as to be capable of turning about a turning axis 20a extending in the vehicle width direction.

The seat turning attachment portions 61a are arranged between a front end and a rear end of the rear base 14 in the vehicle front-rear direction. In particular, as shown in FIGS. 1 and 2, the seat turning attachment portions 61a may be respectively arranged on lower-side regions of the support rods 61 in the vehicle upper-lower direction positioned on the vehicle lower side with respect to the seating portion 22 of the seat 20 in the sitting position. The lower-side regions of the support rods 61 may be formed in a bending manner so as to protrude toward the vehicle front side in substantially triangular shapes. In this case, the seat turning attachment portions 61a may be respectively positioned at apex portions of the lower-side regions protruding toward the vehicle front side in substantially triangular shapes respectively.

Unfolded State and Folded State of Electric Vehicle

The unfolded state and the folded state of the electric vehicle will be described. As shown in FIGS. 1 and 2, the vehicle is in the unfolded state when the mobile base 10 is in the expanded state, the seat 20 is in the sitting position, and the back plate 50 is in the raised position. When the vehicle is in the unfolded state, the vehicle can travel while the user is riding the vehicle. When the vehicle is in the unfolded state, the vehicle can also travel when the user, an assistant, or the like pushes the vehicle by hand while being on the vehicle rear side thereof. The vehicle in the unfolded state may be used as a wheelchair, a cart, and/or the like.

As shown in FIGS. 3 and 4, the vehicle is in the folded state when the mobile base 10 is in the contracted state, the seat 20 is in the retracted position, and the back plate 50 is in the laid down position as described above. When the vehicle is in the folded state, the vehicle can travel when the user pushes the vehicle by hand while being on the vehicle rear side thereof. The vehicle in the folded state can be used as a walking assistance vehicle, a shopping cart, a hand cart, and/or the like.

Method for Attaching and Removing Battery

A method for attaching and removing the battery 30 will be described. First, an operation for receiving the battery 30 in the receiving portion 40 will be described. In the unfolded state of the vehicle, the battery 30 can be received in the receiving portion 40 through the opening 41 while moving from the vehicle rear side toward the vehicle front side. In the folded state of the vehicle, the battery 30 can be received in the receiving portion 40 through the opening 41 after passing through the through hole 51 in the back plate 50 while moving from the vehicle upper side toward the vehicle lower side.

Next, an operation of removing the battery 30 from the receiving portion 40 will be described. In the unfolded state of the vehicle, the battery 30 can be removed from the receiving portion 40 through the opening 41 while moving from the vehicle front side toward the vehicle rear side. In the folded state of the vehicle, the battery 30 can be removed from the receiving portion 40 through the through hole 51 in the back plate 50 after passing through the opening 41 while moving from the vehicle lower side toward the vehicle upper side.

As described above, in the electric vehicle according to this Embodiment, the seating portion 22 of the seat 20 includes the receiving portion 40 configured so as to be capable of receiving the battery 30 and positioned on the seat lower side with respect to the sitting surface 21. The receiving portion 40 has the opening 41 formed in the rear-end portion of the seating portion 22 in the seat front-rear direction such that the battery 30 is receivable in the receiving portion 40 and the battery 30 is removeable from the receiving portion 40. Therefore, when the vehicle is in the unfolded state such that the mobile base 10 is in the expanded state and the seat 20 is in the sitting position and the user is sitting on the seat 20, the battery 30 positioned on the outside of the vehicle can be received in the receiving portion 40 from the opening 41 in the receiving portion 40 in the rear-end portion of the seating portion 22 on the rear side of the vehicle. In this case, the battery 30 received in the receiving portion 40, can be removed from the opening 41 in the receiving portion 40 in the rear-end portion of the seating portion 22 on the rear side of the vehicle. When the vehicle is in the folded state such that the mobile base 10 is in the contracted state and the seat 20 is in the retracted position, the battery 30 positioned on the outside of the vehicle can be received in the receiving portion 40 from the opening 41 in the receiving portion 40 in the rear-end portion of the seating portion 22 on the upper side of the vehicle. In this case, the battery 30 received in the receiving portion 40 can be removed from the opening 41 in the receiving portion 40 in the rear-end portion of the seating portion 22 on the upper side of the vehicle. Therefore, the battery 30 can be efficiently replaced in a wide variety of circumstances, and the battery 30 can be efficiently charged in a wide variety of circumstances.

In the electric vehicle according to this Embodiment, the back plate 50 has the through hole 51 formed so as to correspond to the opening 41 in the receiving portion 40 of the seat 20 in the retracted position and such that the battery 30 is passable therethrough in a state in which the back plate 50 is in the laid down position. Therefore, when the vehicle is in the unfolded state such that the mobile base 10 is in the expanded state, the seat 20 is in the sitting position, and the back plate 50 is in the raised position, and the user is sitting on the seat 20, the battery 30 positioned on the outside of the vehicle can be received in the receiving portion 40 from the opening 41 in the receiving portion 40 in the rear-end portion of the seating portion 22 on the rear side of the vehicle. In this case, the battery 30 received in the receiving portion 40 can be removed from the opening 41 in the receiving portion 40 in the rear-end portion of the seating portion 22 on the rear side of the vehicle. When the vehicle is in the folded state such that the mobile base 10 is in the contracted state, the seat 20 is in the retracted position, and the back plate 50 is in the laid down position, the battery 30 positioned on the outside of the vehicle can be received in the receiving portion 40 from the opening 41 in the receiving portion 40 in the rear-end portion of the seating portion 22 through the through hole 51 in the back plate 50 on the upper side of the vehicle. In this case, the battery 30 received in the receiving portion 40, can be removed from the opening 41 in the receiving portion 40 in the rear-end portion of the seating portion 22 through the through hole 51 in the back plate 50 on the upper side of the vehicle. Therefore, the battery 30 can be efficiently replaced in a wide variety of circumstances, and the battery 30 can be efficiently charged in a wide variety of circumstances.

The Embodiment of the present invention has been described above, but the present invention is not limited to the Embodiment described above, and the present invention may be modified and changed based on the technical concept thereof.

REFERENCE SIGNS LIST

10 . . . Mobile base, 11 . . . Front wheel, 12 . . . Rear wheel, 13 . . . Front base, 14 . . . Rear base, 20 . . . Seat, 21 . . . Sitting surface, 22 . . . Seating portion, 30 . . . Battery, 40 . . . Receiving portion, 41 . . . Opening, 50 . . . Back plate, 51 . . . Through hole, H . . . Wheelbase

The invention claimed is:

1. An electric vehicle comprising:
a mobile base configured to be capable of traveling by an electromotive drive;
a seat arranged on the mobile base and including a seating portion having a sitting surface; and
a battery configured to be capable of supplying electric power used in the electromotive drive,
wherein the seating portion of the seat includes a receiving portion capable of receiving the battery and arranged closer to a lower of the seat than to the sitting surface,
the mobile base includes: a front base including a front wheel; and a rear base arranged closer to a rear of the vehicle than to the front base and including a rear wheel,
the front and rear bases are configured to be moveable relative to each other such that the mobile base is changeable between an expanded state in which a wheelbase between the front wheel and the rear wheel is expanded, and a contracted state in which the wheelbase is more contracted than in the expanded state,
the seat is configured to be moveable between a sitting position that the sitting surface is arranged so as to be directed to an upper of the vehicle, and a retracted position that the seating portion is retracted from the sitting position to the front of the vehicle,
the seat is configured so as to be arrangeable in the sitting position in the expanded state and arrangeable in the retracted position in the contracted state, and
the receiving portion has an opening formed in a rear-end portion of the seating portion in a front-rear direction of the seat such that the battery is receivable in the receiving portion and the battery is removeable from the receiving portion.

2. The electric vehicle as claimed in claim 1, further comprising a back plate arranged on the mobile base and configured to be useable as a backrest corresponding to the seating portion,
wherein the back plate is configured to be moveable between a raised position closer to a rear of the vehicle and an upper of the vehicle than to the seating portion in the sitting position, and a laid down position closer to the front of the vehicle than to the raised position,
the back plate is arrangeable in the raised position in a state in which the seat is arranged in the sitting position, and is arrangeable in the laid down position in a state in which the seat is arranged in the retracted position, and the back plate has a through hole formed so as to correspond to an opening in the receiving portion of the seat in the retracted position and be capable of passing the battery through the through hole in a state in which the back plate is in the laid down position.

\* \* \* \* \*